US005529620A

United States Patent [19]
Corbett et al.

[11] Patent Number: 5,529,620
[45] Date of Patent: Jun. 25, 1996

[54] SHAPED BODIES CONTAINING SHORT INORGANIC FIBERS OR WHISKERS AND METHODS OF FORMING SUCH BODIES

[75] Inventors: William J. Corbett; Marvin C. Lunde, both of Cumming, Ga.; Peter T. B. Shaffer, Grand Island, N.Y.

[73] Assignee: Technical Ceramics Laboratories, Inc., Alpharetta, Ga.

[21] Appl. No.: 476,351

[22] Filed: Jun. 7, 1995

Related U.S. Application Data

[62] Division of Ser. No. 197,797, Feb. 16, 1994, Pat. No. 5,458,181, which is a division of Ser. No. 863,765, Apr. 6, 1992, Pat. No. 5,235,712, which is a division of Ser. No. 690,347, Apr. 24, 1991, Pat. No. 5,153,057, which is a division of Ser. No. 310,381, Feb. 15, 1989, Pat. No. 5,108,964.

[51] Int. Cl.$^6$ .......................... C04B 35/76; C04B 35/80
[52] U.S. Cl. ............... 106/272; 106/287.11; 106/287.13; 106/287.17; 106/287.18; 106/287.19; 106/287.34; 106/287.35; 501/95
[58] Field of Search .............................. 264/60; 106/272, 106/287.11, 287.13, 287.17, 287.18, 287.19, 287.34, 287.35, 272; 501/95

[56] References Cited

U.S. PATENT DOCUMENTS

| | | | |
|---|---|---|---|
| 4,500,504 | 2/1985 | Yamamoto | 423/345 |
| 4,585,500 | 4/1986 | Minjolle et al. | 156/89 |
| 5,024,978 | 6/1991 | Allaire et al. | 264/63 |

*Primary Examiner*—David Brunsman
*Attorney, Agent, or Firm*—Bacon & Thomas

[57] ABSTRACT

A fiber-organic composition includes from about 5% to 50% by volume of uniformly dispersed, non-planar or three dimensionally random oriented inorganic fibers or whiskers, and a thermoplastic material such as paraffin wax. The composition also includes surfactants to promote wetting and dispersion of the inorganic fibers or whiskers. These materials are subjected to high shear mixing to form a uniform randomly oriented three-dimensional dispersion of the inorganic fibers or whiskers. After molding the mixture in such a manner so as not to disrupt the uniform, three-dimensional orientation of the fibers or whiskers, a majority of the thermoplastic material is removed leaving a shaped body or preform having sufficient strength for handling. The shaped body or preform can then be infiltrated with molten metal or the like to form a metal matrix composite.

5 Claims, 4 Drawing Sheets

1. +27.7°
2. +27.7°
3. +55°
4. -36.7°
5. -72.7°
6. +60.5°
7. -60.5°
8. +83.9°
9. +59.8°
10. -26.0°
11. -51.0°
12. -64.7°

AVERAGE ANGLE = 52.2°
THEOR. RANDOM = 45

LONGITUDINAL SECTION OF COMPOSITE SPECIMEN WITH 42 VOL. % SiC WHISKERS 1000X

SHAPED BODIES CONTAINING SHORT INORGANIC FIBERS OR WHISKERS AND METHODS OF FORMING SUCH BODIES

This application is a Division of application Ser. No. 08/197,797, filed Feb. 16, 1994, now U.S. Pat. No. 5,458,181; which is a Division of application Ser. No. 07/863,765, filed Apr. 6, 1992, now U.S. Pat. No. 5,235,718; which is a Division of application Ser. No. 07/690,347, filed Apr. 24, 1991, now U.S. Pat. No. 5,153,057, issued Oct. 6, 1992; which is a Divisional of application Ser. No. 07/310,381, filed Feb. 15, 1989, now U.S. Pat. No. 5,108,964, issued Apr. 28, 1992.

BACKGROUND OF THE INVENTION

This invention relates to shaped bodies which contain short fibers or whiskers, moldable ceramic-organic compounds or compositions for use in such bodies, metal or ceramic matrix composites which include such bodies, and methods for producing the shaped bodies and composites.

A need for lightweight, high strength, cost competitive parts by the aircraft, automotive and other industries has led to a demand for improved strength to weight ratio materials such as metal matrix composites. In addition, there is a growing demand by such industries for metal matrix composites having relatively complex shapes which require little or no finish machining.

In general, metal matrix composites have a dispersed inorganic or ceramic reinforcing phase which imparts improved strength and stiffness. For example, some improvement in strength and stiffness can be obtained by incorporating ceramic particles in the matrix. And, a more dramatic improvement can be obtained when short ceramic fibers or whiskers are used as the reinforcing phase.

However, the properties of such composites, reinforced with ceramic fibers or whiskers depend strongly upon the orientation of the fibers or whiskers. For example, composites produced with three-dimensionally random oriented fibers or whiskers have isotropic properties (i.e., directionally independent). Metal matrix composites reinforced with fibers or whiskers having one (planar) or two (unidirectional) degrees of orientation exhibit anisotropic properties (i.e., directionally dependent). Thus, except for simple structures such as stiffeners or struts, metal matrix composites having isotropic properties are more desirable. Also, there is an increasing demand for such composites having complex shapes.

In producing metal matrix composites, it is also highly desirable to obtain uniformly distributed fibers or whiskers in a predetermined concentration. It is also desirable to preform the reinforcing phase (i.e., the ceramic fibers or whiskers) into a shaped structure or preform. This shaped structure or preform can then be infiltrated with molten metal or the like to produce a composite part without significantly damaging the structural integrity of the fibers. In addition it is desirable to obtain a relatively high concentration of fibers in the order of up to 50% or possibly more by volume of a composite to increase the strength, the stiffness or otherwise improve the physical characteristics of the part.

In general, the presently used techniques for fabricating reinforcing phase preforms utilize paper making technology in which the inorganic fibers or whiskers are suspended as a slurry and collected as a mat by vacuum filtration. The densities of such mats are limited and typical contain from 4 to 8% fiber by volume. Such mats have a density gradient in the direction of filtration. In addition the vacuum filtration technique produces a fiber mat wherein the fibers have a two-dimensional planar orientation instead of a more desirable random or three-dimensional dispersion as provided by the present invention. In some cases multiple mats have been superimposed on one another and compressed in an effort to increase the fiber density, however, this approach does not usually increase the density sufficiently and tends to further orient the fibers into a planar array. This approach also tends to break fibers. Furthermore, the shades produced using the above described preforms are limited to relatively simple shapes which are then subjected to expensive and time consuming machining to produce more complex shapes.

Efforts to produce shaped metal matrix composites having a uniformly distributed three-dimensional random reinforcing phase of ceramic fibers or whiskers, by either conventional powder metallurgy techniques or by mixing the reinforcement phase into the molten metal prior to casting (compocasting) have enjoyed only limited success.

Hood et al., U.S. Pat. No. 4,463,058, discloses a method wherein silicon carbide whiskers are uniformly dispersed and/or distributed in a metal matrix. The method comprises forming a slurry of whiskers and mixing the slurry with an aluminum powder. In this manner, silicon carbide whiskers can be added in amounts of up to 50% by volume of the total finished composite. However, as formed the fibers are oriented relative to the surface of the aluminum particles; and, after forging, the fibers tend to have a planar or parallel dispersion rather than three-dimensional random orientation.

There have been a number of attempts to produce improved preforms and metal matrix composites. For example, Motohiro Yamamoto and Minoru Fukazawa of the Tokai Carbon Company Limited disclose a method for manufacturing fiber oriented preforms in their U.S. Pat. No. 4,500,504. They disperse silicon carbide (SiC) whiskers in molten paraffin wax. And then, the resulting mixture after removing excess wax is cooled to a plastic state and formed by extruding through a nozzle or slit. And then, the extrudate is heated at more than 400° C. for removal of the wax. The manufactured preform consists of oriented fibers which are planar or even parallel. In addition, it is difficult to control and reproduce fiber loading.

A similar approach is taught by Masaharu Oshima, Hiroe Okawa, Katsuhiro Kishi, Toshihiro Manaki and Kenishi Shibata of Nissan Motor Company entitled "Extension in Forming Fibrous Preform for Composites," as reported in Chemical abstracts. The Masaharu Oshima abstract discloses extruding a slurry of randomly oriented fibers which tends to produce aligned orientation, and then heating the extruded mass to remove the salt. These silicon carbide whiskers were then dispersed ultrasonically in an aqueous slurry containing an anionic surfactant (Sintrex) and then vacuum formed into a porous disk. The air in the disk was then replaced with molten wax by vacuum impregnation with a molten solution (100° C.) containing paraffin wax, VE722 copolymer, and surfactant Stafoam DO. The impregnated disk was heated at 55° in a mold cavity and then extruded. The manufactured rod was dewaxed at about 200° C., sintered at 800° C. and pressure infiltrated with an aluminum alloy at approximately 800° C. at 800 kg/cm$^2$. The resulting product showed tensile strength of approximately 57 kg/mm$^2$. However, this technique also produces preforms having parallel oriented fibers and cannot be used to produce shapes having isotropic properties.

It has now been found that shaped bodies or preforms containing ceramic whiskers and metal matrix composites according to the present invention can be produced with relatively high percentages of uniformly distributed three-dimensionally oriented inorganic fibers or whiskers. It has also been found that such bodies can be produced in relatively complex shapes.

In addition it has been found that novel inorganic fiber-organic compositions according to the present invention can be injection molded without significantly damaging or displacing the three-dimensional orientation of the fibers. And these molded products can be converted into ceramic fiber or whisker preforms according to the present invention.

It has also been found that shaped bodies or preforms for the production of metal or ceramic matrix composites can be produced in accordance with the novel methods disclosed herein. Such methods not only produce preforms and metal matrix composites having consistently reporoducible concentrations of uniformly distributed three-dimensionally oriented inorganic fibers or whiskers, but also traduce such products economically.

SUMMARY OF THE INVENTION

In essence a shaped body or preform according to the present invention comprises a mass of short inorganic fibers or whiskers which are uniformly dispersed throughout the body with a high degree of three-dimensional random orientation. These fibers amount to at least about 5% by volume and preferably from 10% to about 40% or more by volume and may or may not be bonded to one another at their points of contact. In a preferred embodiment of the invention the ceramic fibers or whiskers are uniformly dispersed throughout the body are essentially free of organic materials and have sufficient structural integrity for handling or infiltration by molten metal without fiber deformation. The whiskers may be bonded together by a ceramic to ceramic bond at their points of contact or at times held together by entanglement. In some cases temporary bonding can be accomplished by leaving a residual amount of organic material (for example about 0.3 to about 0.5% by wgt) to hold the fibers in place.

Accordingly, the shaped bodies according to a preferred form of the invention have relative densities which are about equal to or equal to the volume fraction of fibers. Relative density means of the actual density of the body compared with what it would be if composed totally of fiber without voids i.e. 100%

The invention also contemplates a inorganic fiber-organic composition which is suitable for injection or other type of molding. This composition comprises from about 5% to about 50% and preferably from about 10% to about 40% by volume of relatively short ceramic fibers or whiskers and about 50% to about 95% by volume of an organic thermoplastic molding compound such as a wax. In addition, organic surfactants in an amount of about 0.01 to about 5% by weight of the total composition are included in order to obtain the rheological properties which are required for molding the ceramic organic composition into a predetermined shape. A shaped body or preform according to the present invention may also include a fugitive material or a material which can be carbonized for use in bonding the fibers to one another. A fugitive material can be used to control the fiber loading and rheology of the mix.

In addition a metal matrix composite according to the present invention comprises a continuous metal phase and a mass of short inorganic or ceramic fibers or whiskers as described above with respect to the shaped bodies. The inorganic fibers or whiskers are molded with a high degree of three-dimensional random orientation to form a shaped body or preform. Such fibers comprise at least about 5% and preferably 10% or more by volume of the body and may be bonded to one another at their points of contact or held together by entanglement or interparticle forces. And then, a molten metallic mass infiltrates and surrounds said fibers to thereby form the metal matrix composite. In a preferred embodiment of the invention the fibers are "free floating", i.e., they are not bound to one another in the finished composite. For example, the filers in the preform were held together by entanglement or any temporary binder removed or dissolved during infiltration by the molten metal.

A metal matrix composite according to another embodiment of the invention includes from 10% to about 40% by volume of ceramic whiskers which are bonded together by sintering or reaction bonding and are then infiltrated and surrounded with molten metal which is cooled.

In accordance with a further embodiment of the invention a shaped body may be formed by the novel process as follows. A mass of heated thermoplastic molding composition in its fluid state is provided and combined with a mass of short metal, carbon or ceramic fibers. In practice about 10% to about 40% by volume on the short ceramic fibers are dispersed into the heated thermoplastic molding material. In addition a surfactant or surfactants are added to the fiber containing composition to thereby form a mixture. This mixture is then subjected to high shear stirring at an elevated temperature, vacuum degassed and introduced into a mold cavity by casting or injection molding while maintaining the three-dimensional random orientation of the fibers. In other words, care is taken to avoid any significant disturbance of the fiber or damage to the three-dimensional random orientation of the fibers during molding. The mold and mixture contained therein are cooled and a molded shade removed therefrom. And then, a majority if not all of the thermoplastic compound is removed to thereby provide a shaped preform of fibers having sufficient strength to allow handling of the preform and introduction of molten metal without disturbing the fibers or deforming the preform. In most cases all but a nominal amount of the thermoplastic is removed, i.e., less than 1% by wgt of thermoplastic remains. Thus, the relative density of the shaped body is about equal to the volume fraction of fiber.

In one embodiment of the invention, the fiber-organic mixture is introduced into a mold cavity by injection molding with relatively low pressures, i.e., about 10 to about 1,000 psi but preferably about 15 to about 150 psi.

In a preferred embodiment of the invention, the majority of a thermoplastic molding compound is removed leaving only a residual amount bonding the fibers together at their points of contact. At this stage the preform is subjected to high temperature to remove the residual thermoplastic molding compound. The preform may then be subjected to a higher temperature (e.g., above about 800° C.) to form a ceramic to ceramic bond between the fibers at a point where they contact one another. In other cases the fiber structure is used as a preform without any need for a ceramic to ceramic or other bond. In the latter case the relative density of the preform or shaped body is equal to the volume fraction of fiber.

The invention also contemplates forming a metal matrix composite from the shaped preform described above by subsequently forming a solid metallic shape which includes the inorganic fiber preform. For example the metal matrix composite can be made by infiltrating and surrounding the inorganic fibers in the preform with a molten metal.

The invention also contemplates forming a ceramic matrix composite containing three-dimensional randomly-oriented inorganic fibers or whiskers by adding powders to the molding mix, and/or using chemical vapor infiltration of the melded ceramic fiber preform.

DETAILED DESCRIPTION OF THE INVENTION

Figure 1:
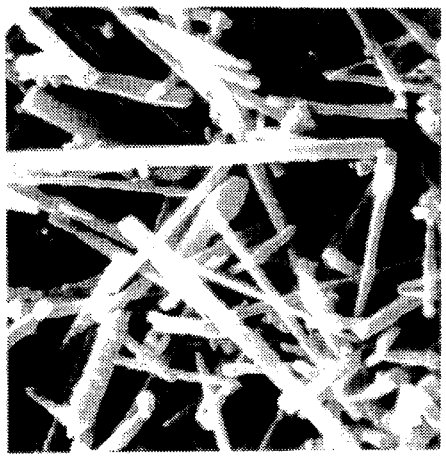
FIG. 1 is a photomicrograph of a mass of silicon carbide whiskers produced by Tateho Chemical Industries, Type SCW-1, showing the random orientation of the whiskers at 6000× magnification.
Figure 2:
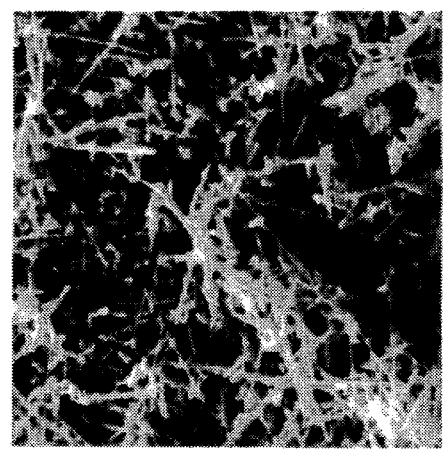
FIG. 2 is a photomicrograph of the center of a fracture surface of a shaped body with 0.37 volume fraction of silicon carbide whiskers at 1500×.
Figure 3:
FIG. 3 is a photomicrograph of the center of a fracture surface of a shaped body with 0.37 volume fraction of silicon carbide whiskers at 6000×.
Figure 4:
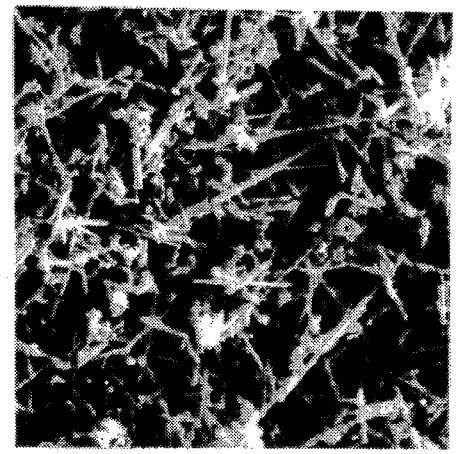
FIG. 4 is photomicrograph of the same part as shown in FIGS. 2 and 3 at 1500×, but taken near the edge to show the uniformity of structure and random fiber orientation.
Figure 5:
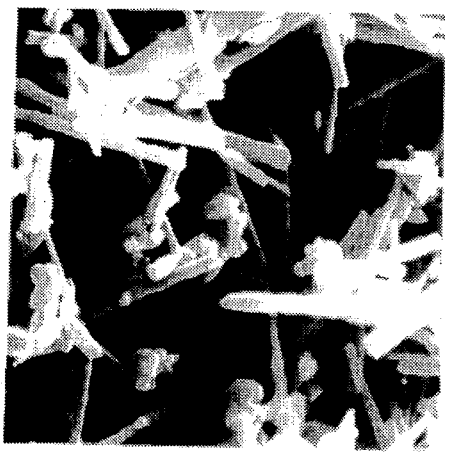
FIG. 5 is a photomicrograph of the section illustrated in FIG. 4, but at 6000×.

The present invention relates to moldable inorganic fiber-organic molding compositions containing ceramic whiskers or the like having three-dimensional random orientation and to preforms which are made from such compositions it also relates to metal or ceramic matrix composites and to methods for forming shaped preforms and metal matrix composites containing such preforms. For the purpose of clarity, the detailed description is divided into five sections. The first section relates to fiber-organic compositions which are suitable for molding, the second to shaped bodies formed from such compositions, the third to metal or ceramic matrix composites containing such preforms and the fourth and fifth to methods of forming shaped preforms and metal and ceramic matrix composites respectively.

INORGANIC FIBER-ORGANIC COMPOSITIONS

The fiber (inorganic)-organic compositions which have been found suitable for molding comprise from about 5% to about 50% or more by volume of relatively short inorganic fibers. In addition such compositions include about 50% to about 95% by volume of an organic thermoplastic molding compound such as a wax and up to about 5% (by weight) of a surfactant or surfactants to aid in wetting and dispersion of the fibers.

The fiber component of the fiber-organic composition comprises a mass of short inorganic fibers or whiskers which are present in an amount of at least 5% by volume. A range of about 10% to about 40% by volume is preferred. And, at fiber concentrations of below 20% by volume, the stability and rheology of the mixture may be enhanced by a fugitive or pseudo fugitive material to permit satisfactory molding.

The short inorganic fibers referred to herein as whiskers will be described with reference to silicon carbide whiskers. However it should be understood that other short carbon, metallic, or ceramic fibers, whiskers or chopped filaments can be substituted therefor without departing from the scope of the appended claims. For example, inorganic fibers or whiskers may include alumina, aluminum nitride, aluminum silicate, silicon carbide, silicon dioxide, silicon nitride, magnesium oxide, boron carbide, titanium nitride, zirconium dioxide, or mullite, titanium, tungsten, iron, etc.

A silicon carbide whisker as used in a presently preferred embodiment of the invention is a single crystal of microscopic size, and greatly elongated relative to its diameter. Diameters are typically from less than 0.1 to 10 micrometers. However as the whiskers become larger they tend to develop facets and their strength decreases. Therefore, the strongest whiskers and those most applicable to the present invention have diameters which are less than about 2 micrometers. Such silicon carbide whiskers have a relatively high surface mass ratio and are relatively unstable as compared to usual silicon carbide crystals for example, they tend to recrystallize at temperatures above about 1750° C., and to oxidize in air at temperatures below 1000° C.

Such whiskers can be produced by the methods disclosed in the United States Patent granted to W. W. Pultz, U.S. Pat. No. 3,335,049, which is incorporated herein by reference. In essence, the whiskers are produced when charges of silica and carbon are heated to a critical temperature range in an atmosphere resulting from the introduction of carefully controlled partial pressures of an inert gas and carbon monoxide. The submicroscopic fibers containing silicon carbide crystals having diameters averaging about 0.025 micrometers and lengths up to 100 micrometers and sometimes longer are produced by initially mixing together the charge of silica and carbon in a molar ratio of 1:1–1:4. The mixture is transferred to a furnace and heated to a temperature of about 1375°–1575° C. for a time sufficient to obtain the desired fiber formation during which time a carefully controlled partial pressure of carbon monoxide, along with an inert diluent gas, e.g., hydrogen, helium or argon, is introduced. The partial pressure of carbon monoxide ranges from about 5–500 mm of mercury. For convenience, the total pressure within the regular system is held at one atmosphere although pressures lower or higher can be utilized.

It should also be recognized that commercially available ceramic whiskers such as silicon carbide include up to 15% particulate matter. Therefore, in referring to the percentage of whiskers in a final composition, such whiskers normally include a small amount of particulate material. It should also be recognized that in those embodiments wherein particulate material or powder is added, that amount is in addition to the particles which are inherent with the fiber.

At times it may be desirable to increase the ceramic loading in the fiber-organic compositions of the invention by adding small amounts of ceramic powder. For example, amounts of up to about 10% or more by volume of silicon carbide particles may be added. Ceramic powder is preferably utilized in its finely divided form, for example the preferred silicon carbide material has an average size particle from about 0.10 to about 2.0 microns (19 $m^2/g$ to about 1 $m^2/g$), with a maximum size of about 5.00 microns (0.4 $m^2/g$). Although size is an important parameter, surface area is also relevant in selecting a suitable material. Accordingly, the referred silicon carbide particles as used in the present composition have a surface area of from about 1 to about 20 $m^2/g$. It is presently preferred that the surface area of particles range between about 5 to about 20 $m^2/g$.

The principle organic component of the thermoplastic compounds can be selected from a variety of materials such as waxes, acrylic resins, nylon, polyethylene, polyethylene glycol, ethylene-vinyl acetate, polybutylene, polypropylene and the like. However, in a preferred form, the thermoplastic compounds are selected from the waxes. Such waxes include virtually any wax such as parafin, microcrystalline, carnauba, polyethylene wax, synthetic hydrocarbon wax, etc.

The preparation of inorganic fiber-organic compositions or mixes, in the practice of our invention, involve accomplishing three distinct objectives.

1. Wetting of the inorganic fibers or whiskers by a binder;
2. Substantial deaggregation or deflocculation of fiber or whisker clusters; and
3. Prevention of reaggregation of the fibers or whiskers.

For the inorganic fibers, whiskers, or clusters thereof, to be dispersed into the binder phase involves wetting of the fiber or whisker surfaces by the binder phase, whereby air is displaced from the surfaces by the binder phase. In several of the preferred embodiments of our invention either a paraffin wax, a mixture of paraffin wax and microcrcrystalline wax, or a mixture of paraffin wax, microcrystailine wax and montan wax, compose the major portion of the binder phase. Paraffin wax is used not only for its very low viscosity in the molten state, but also because of its generally lower contact angle with (i.e., greater wettability of) ceramic surfaces. Waxes of various average molecular weights and melting points may be used as will be well-understood by those of ordinary skill in ceramic forming techniques. Montan wax is useful for its assistance in wetting the ceramic fibers or whiskers. Microcrystalline wax, as is well known, imparts strength the molded parts. Additionally, certain substances may be added to the binder phase which further aid in the wetting of the inorganic fiber or whisker surfaces. Such substances are commonly known as surfactants or wetting agents. Fatty acids such as stearic acid or oleic acid, or fatty acid esters such as sorbitan monostearate, are common examples.

Even though the inorganic (preferably ceramic) fibers or whiskers have been wet by the binder phase, they may still be aggregated into clumps or flocs which should be broken up for the ceramic fibers or whiskers to be well dispersed into the binder phase. Good dispersion is necessary if the final molded fiber or whisker preform is to have a homogeneous microstructure, and probably essential if it is desired to obtain the maximum concentration of ceramic fibers or whiskers in the molding mix. Therefore, it is desirable to use a mixer that produces a high degree of shearing action during the mixing, or compounding, of the mixes.

There are many high shear mixers on the market, a number of which are commonly used in the plastics industry. In the preferred embodiment of our invention, we use a double planetary mixer having provisions for both heating and evacuating the mixing chamber. However, in some cases, even the shear developed by such a mixer is not sufficient to achieve good dispersion of the fiber or whisker flocs. This is particularly true in those cases where the ceramic fibers or whiskers have been previously processed by spray-drying. In such cases, an additional mixing step, employing a so-called "high intensity" mixer, is recommended. This type of mixer usually has a fixed cylinder and a rotating cylinder in axial alignment with one another. Two rotating discs, axially aligned at their centers, and having close spacing, can also be used. The spacing between the two cylinders or discs is quite small, so that when the molten mix is forced through the space it is subjected to an intense shearing action. This shear level is generally sufficient to deaggregate even the most tightly bound clumps or flocs of ceramic fibers or whiskers. It is possible, of course, to use mixers that incorporate both double planetary and high intensity mixing actions in a single mixing unit.

Once the inorganic fibers or whiskers have been dispersed into the binder phase, it is desirable to prevent the individual dispersed ceramic fibers or whiskers from coming together once again to form aggregates. This requires the formation of repulsive interparticle forces. In non-polar organic media, such as waxes, electrostatic barriers to aggregation are usually ineffective and steric barriers are generally required to disperse solid particles. Such barriers are developed using certain surfactants which function as dispersing agents. These dispersing agents are adsorbed at the fiber/binder interface, and stability arises because the adsorbed molecules extend into the organic media and inhibit the close approach of two particles to each other.

In a preferred embodiment of our invention, we employ dispersing agents which have a chemically functional group that is adsorbed at the interface between the ceramic fibers or whiskers and the wax, and has an organophillic polymeric chain that extends into the wax phase. The adsorbed functional group couples to the fiber or whisker surfaces via hydrogen bonding (most ceramics surfaces are hydroxylated) or weak chemical bonding. The organophillic polymeric chains extending into the wax phase creates steric barriers either from the energy required to desolvate these chains as the ceramic fibers or whiskers approach one another, or from the decrease in the entropy of the system as these polymeric chains are restricted in their movement or arrangement by the close approach of two ceramic fibers or whiskers.

There are many such "coupling type" dispersing agents. One example is menhaden oil. This fish oil is an effective dispersing agent for ceramic particles in nonpolar organic solvents due to the presence of carboxylic acid groups along the triglyceride chains, formed as a result of oxidation of the oil during processing. The carboxylic acid groups anchor strongly to the hydroxylated ceramic particle surfaces, while the long flexible triglyceride chains extend into the nonpolar organic dispersion medium providing a strong steric barrier to flocculation.

The polymeric fatty esters are another example, where the carboxylic acid groups anchor strongly to the hydroxylated ceramic particle surfaces and the alkyl groups and aliphatic chains extending into the nonpolar organic dispersion medium provide a strong steric barrier to flocculation. Other examples include the alkylbenzenes, where the benzene rings anchor to ceramic particle surfaces while the aliphatic chains extend into the hydrocarbon dispersion medium. For any such coupling type dispersing agent, the stability of the dispersion increases with the number and length of the alkyl groups or aliphatic chains that extend into the hydrocarbon dispersion medium.

In the practice of our invention it is also sometimes advantageous to add various other functional compounds to the mixes: emulsifiers, such as lecithin or Ciba-Geigy's proprietary Alrosperse 11P: and materials such as KantStik Z Powder (a micronized microcrystalline wax) that is marketed by Specialty Products Company of Jersey City, N.J. as a proprietary lubricant for injection molding mixes.

When preparing the molding mixes, in the practice of our invention, there is nothing critical regarding the order of addition of ingredients. For example, the ingredients of the binder phase, waxes, wetting agents, dispersing agents, etc., can all so placed in the mixer and melted together. The ceramic fibers or whiskers can then be added, and mixed until a stable dispersion is obtained. Conversely, the waxes can be melted in the mixer, the fibers or whiskers added, and the other ingredients (i.e., wetting agents, dispersing agents, etc.) added while mixing is taking place.

Following the introduction of all the ingredients of the molding mix, and after any "high intensity" mixing, it is desirable to continue mixing in a double planetary mixer or the like with the bowl under vacuum for at least about 30 minutes. This removes any entrapped air from the mix and improves the quality of subsequent moldings.

After a stable three-dimensionally random dispersion has been produced, the mix can be transferred from the mixer to suitable molds or an injection molding machine while still fluid, or solidified in some suitable pan or container for storage. If desired, the heat to the mixer bowl can be shut off while the mixing action is continued, preferably under vacuum, and a granulated or pelletized product will be obtained, which can be stored.

Having obtained a fiber-organic molding mix containing well dispersed, three-dimensional randomly oriented fibers, it is necessary to carry out molding without destroying either the uniform dispersion or the random orientation of the filer, as was done in the practices of Yamamoto and Fukazawa, or Oshima et al. cited previously. This can be accomplished either by conventional casting or by injection molding. However, if injection molding is employed, care should be taken to avoid subjecting the molten mix to high shearing forces which may produce alignment of the fiber, and prevent the desired three-dimensional orientation in the molded body. With conventional injection molding machines, utilizing injection pressures of 1,000 psi or greater, this requires the use of gates and runners having very large cross-sectional areas. Also, even with such gates and runners, the random fiber orientation may be destroyed within narrow cross-sections of the molded part when such injection pressures are employed.

Thus, in a preferred embodiment of this invention low pressure (i.e., less than 1,000 psi) injection molding is employed to produce a shaped part from the fiber-organic molding mix. The fiber-organic molding mixtures of the present invention are sufficiently fluid when molten that pressures of less than 1,000 psi, and in certain cases less than 150 psi, are adequate to injection mold the melt. Such low pressures can be conveniently obtained by air pressure applied to a molten mass of the mix contained in a suitable pressure pot having a valve and nozzle for conveying the mix to a gate of a mold. Another convenient method is the use of a hydraulic piston acting on a chamber containing a molten mass of the mix. Of course, conventional screw or piston delivery machines, as are used for the injection molding of plastics, may be used if the delivery pressure has been reduced to the low pressures desired according to a preferred embodiment of our invention.

The fiber-organic mixture to be molded is injected into the mold with sufficient heat and pressure to cause the mix to flow into all areas of the mold. The exact temperature will depend upon the melting point of the particular thermoplastic mixture employed, but a temperature slightly higher than the melting point of the mixture is generally used. A pressure of about 10 to 150 psi is usually sufficient to force the present mixtures into a mold.

Employing the techniques disclosed herein, it has been found possible to obtain a uniform, reproducible, three-dimensionally random distribution of fibers throughout a shaped body even in those cases involving complex shapes. The following examples are presented for the purpose of illustration of this invention, and are not intended as limitations thereof. In the examples, "parts" means parts by weight.

EXAMPLE 1

28.45 parts of paraffin wax, 1.87 parts of microcrocrystalline wax and 0.91 parts of montan wax were melted together in a heated mixing bowl of a double planetary mixer. While mixing, 0.65 parts of oleic acid, 0.91 parts of polymeric fatty esters, and 0.26 parts of lecithin were added. With continued mixing, silicon carbide whiskers (Tateho Chemical Industries SCW #1-S) were added in incremental amounts until 66.62 parts had been incorporated. Mixing was continued, with the mixing bowl under vacuum, for approximately two hours. This mix was transferred to a low pressure injection molding machine, and cylindrical preforms 4⅞ inches in length and 0.5 inch in diameter were molded at an injection pressure of 30 to 40 psi. These preforms, after removal of the binder phase, were 0.375 volume fraction silicon carbide whiskers. The whiskers were randomly oriented within the preforms, as shown by the micrograph presented as FIG. 2, 3, 4, and 5.

EXAMPLE 2

Figure 6:
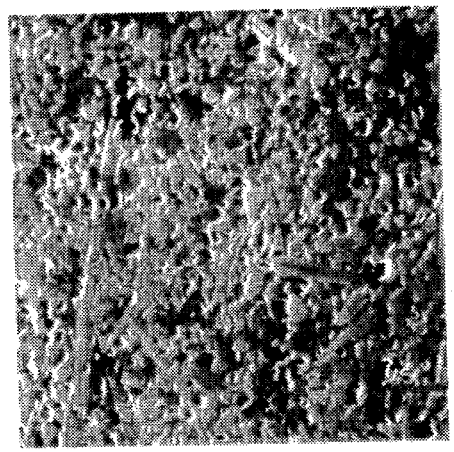
FIG. 6 is a photomicrograph of a polished surface through a silicon carbide whisker preform having 0.2 volume fraction of whiskers after squeeze casting to introduce approximately 0.8 volume fraction of aluminum metal at 6000×.
Figure 7:
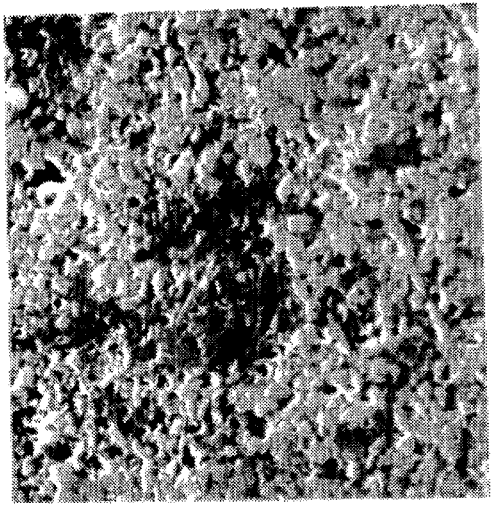
FIG. 7 is a photomicrograph showing another section of the composite shown in FIG. 6 at the same 6000× magnification.

44.5 parts of paraffin wax, 3.01 parts of microcrystalline wax, and 1.38 parts of montan wax were melted together in the heated mixing bowl of a double planetary mixer. While mixing, 1.06 parts of oleic acid, 1.07 parts of polymeric fatty esters, 0.41 parts of lecithin, and 2.67 parts of micronized microcrystalline wax were added. With continued mixing, silicon carbide whiskers (Tateho Chemical industries SCW #1-S) were added in incremental amounts until 45.43 parts had been incorporated. Mixing was continued, with the bowl under vacuum, for approximately two hours. The mix was transferred to a low pressure injection molding machine, and cylindrical preforms 4⅞ inches in length and 0.5 inch in diameter were molded at an injection pressure of 75 to 90 psi. These preforms, after removal of the binder phase, were 0.20 volume fraction silicon carbide whiskers. The whiskers were randomly oriented within the preforms. One of the preforms was subsequently heated, placed into a suitable mold, and molten aluminum was squeezed cast into the preform. Photomicrographs of the resulting whisker reinforced metal matrix are presented as FIG. 6 and 7.

EXAMPLE 3

Figure 8:
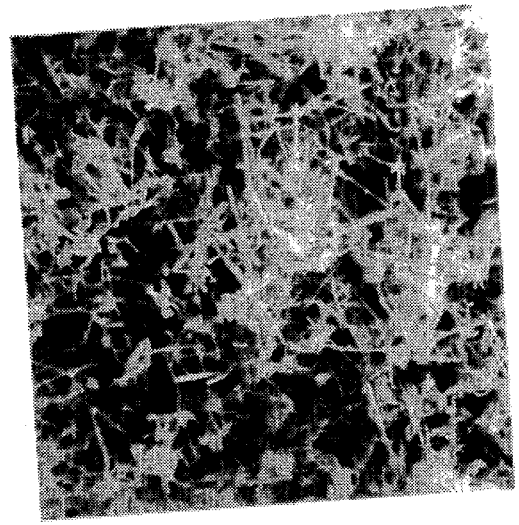
FIG. 8 is a photomicrograph of a fracture surface of a shaped body with 0.10 volume fraction of $Si_2N_4$ whiskers at 1500×.
Figure 9:
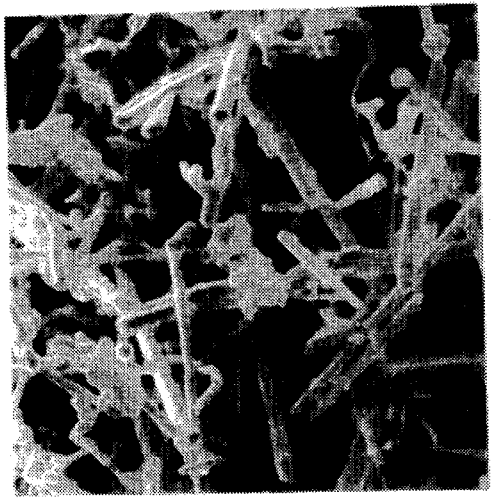
FIG. 9 is a photomicrograph of the same section as shown in FIG. 8 but at 6000×.

32.60 parts of paraffin wax, 16.30 parts of oxidized paraffin wax, 10.87 parts of microcrystalline wax and 5.43 parts of polyethylene wax were melted in the heated mixing bowl of a double planetary mixture. While mixing, 0.21 parts of oleic acid, 0.49 parts of stearic acid, and 5.43 parts of micronized microcrystalline wax were added. With continued mixing, silicon nitride whiskers (Tateho Chemical Industries SNW #1-S), were added in incremental amounts until 26.66 parts were incorporated. Mixing was continued, with the bowl under vacuum, for approximately two hours. The mix was transferred to a low pressure injection molding machine, and rectangular preforms 4½"×⅜"×⅝" were molded at an injection pressure of 30 psi. These preforms, after removal of the binder phase, were 0.101 volume fraction silicon nitride whiskers. The whiskers were randomly oriented within the preforms, as shown by the micrographs presented as FIG. 8 and 9.

EXAMPLE 4

Figure 10:
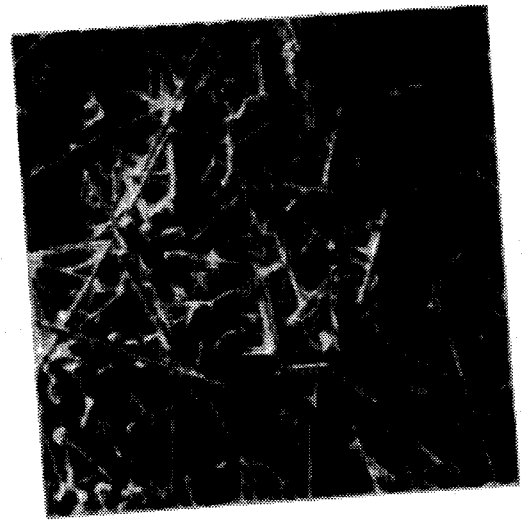
FIG. 10 is a photomicrograph of silicon carbide whiskers from Advanced Composite Materials Corporation of Greer, S.C., with an organic adhesive added to assist in making the photomicrograph of a fracture surface at 2500×.

33.94 parts of paraffin wax, 1.75 parts of microcrystalline wax, and 1.18 parts of montan wax, were melted together in the heated mixing bowl of a double planetary mixer. While mixing, 0.32 parts of Alrosperse 11P, 0.67 parts of oleic acid, 0.95 parts of polymeric fatty esters, 0.29 parts of lecithin, 0.11 parts of stearic acid, 0.25 parts of sorbitan monostearate, and 3.15 parts of micronizod microcrystalline wax, were added. With continued mixing, 14.04 parts of Tateho silicon carbide whiskers (Tateho Chemical Industries SCW #1-S) and 43.35 parts of Advanced Composites Materials Corporation silicon carbide whiskers were added incrementally. The mix was then subjected to two hours of mixing in a high intensity mixer. Mixing was continued in the double planetary mixer, with the bowl under vacuum, for approximately two hours. The mix was transferred to a low pressure injection molding machine, and hexagonal mirror preforms were molded at an injection pressure of less than 120 psi. These preforms measured approximately five inches flat to flat and were one-quarter inch thick. The injection gate was located on one flat of the preform, and the injection direction was perpendicular to the narrow dimension, or thickness, of the preform. These preforms after removal of the binder phase, were 0.388 volume fraction (38.8 volume percent) silicon carbide whiskers. Despite the approximately 20 to 1 aspect ratio of these preforms, the whiskers were randomly oriented within the preforms, as shown by the micromicrograph presented as FIG. 10.

EXAMPLE 5

56.27 parts of paraffin wax and 3.72 parts of microcrystalline wax were melted together in the heated mixing bowl of a double planetary mixer. While mixing, 0.24 parts of oleic acid, 0.20 parts of Alrosperse 11P, 0.41 parts of polymeric fatty esters, 0.26 parts of sorbitan monostearate and 0.35 parts of micronized microcrystalline wax were added. With continued mixing, 32.45 parts of short alumina fibers (ICI Americas Inc., Saffil), having a median diameter of 3 microns and an average aspect ratio of 50 to 1, were added in incremental amounts. The mix was then subjected to one hour of mixing in a high intensity mixer. Mixing was continued in the double planetary mixer, with the bowl under vacuum, for approximately two hours. The mix was transferred to a low pressure injection molding machine, and rectangular preforms 4½"×⅜"×⅝" were molded at an injection pressure of 20 psi. These preforms, after removal of the binder phase, were 0.104 volume fraction (10.4 volume percent) alumina fiber.

For injection molding, injectability is dependent to a high degree on the fiber aspect ratio. The aspect ratio is the length of the fiber divided by its diameter. In other words, shorter fibers or those with a lower aspect ratio are more similar to equiaxed particles and more easily injected into a die. Generally, fibers with an aspect ratio of less that 10:1 will not produce a three-dimensional random preform. In addition, it is generally easier to obtain uniform distribution of equiaxed particles, particularly those having a narrow size distribution. However, by applying the techniques disclosed herein, it has been found possible to obtain uniform reproducible distribution of fibers throughout a shaped body, even in those cases involving relatively complex shapes and with fibers having aspect ratios of from about 20–100:1.

SHAPED BODIES

The shaped bodies according to the present invention comprise a mass of short inorganic fibers or whiskers dispersed throughout the body with a high degree of randomness. Such fibers amount to at least about 5% and preferably at least 10% by volume and may or may not be bonded to one another at their points of contact. Such fibers are uniformly dispersed throughout the body. It is also contemplated that such bodies may include a residual amount of a thermoplastic material which bonds the ceramic whiskers to one another at their points of contact. In other applications, residual organics are not desirable.

A shaped body or preform, according to a presently preferred embodiment of the invention, comprises a mass of three-dimensionally random oriented uniformly dispersed ceramic whiskers which form a predetermined shape. These whiskers have lengths of between about 5 and more than 1,000 microns and diameters of about 0.05 to 5 microns. In addition, the fibers make up from about 10% to about 40% by volume of the body and may or may not be bonded to one another at their points of contact. Initially, the fibers may be bound together by residual wax or by a fugitive material which can be carbonized by heat. And then the carbonized material is subjectad to higher temperatures in the order of 800° C. to thereby form a carbon bond. In some cases, there is no residual material and the fibers or whiskers are bound together by mechanical means such as being held together by entanglement, static charge, Van der Waals forces, or other means which are not understood.

In essence, the shaped bodies disclosed herein are made up of a mass of three-dimensionally random oriented inorganic fibers or whiskers. Such whiskers may, for example, be silicon carbide, silicon nitride, alumina, aluminum nitride, boron carbide, mullite, magnesium oxide, or the like. The fibers may also be carbon or graphite, silica, mullite, iron, titanium, tungsten, etc. In essence, the fibers have an average diameter of from about 0.01 microns to 25 microns, a length from about 5 to over 1000 microns. In addition, such bodies, according to a preferred to embodiment, consist essentially of ceramic whiskers and are free of other materials except for the small amount of particulate material which is contained in or carried by the ceramic whiskers.

In another embodiment of the invention, the ceramic whiskers are silicon carbide and amount to from about 10% to about 40% by volume of the shaped body. In addition, the fibers have an average diameter of about 0.4 micrometers and length of about 25 to 75 micrometers. In this form, the fibers may be bonded together at their points of contact by a residual amount of about 1–3% by volume of the paraffin material, by oxidation to form silicon dioxide or by forces arising from the entanglement and contact of the whiskers one with another.

In addition, such bodies may be densified by sintering, hot pressing, reaction bonding or hot isostatic pressing (HIPing).

METAL MATRIX COMPOSITES

Fiber and particulate reinforced composites, according to the present invention, have improved stiffness and strength as compared to unreinforced alloys and, as compared to other reinforced composites as currently produced. This improved strength and stiffness is due to a relatively high volume of ceramic whiskers or fibers and the uniform distribution of whiskers which are dispersed in a nonplanar or three-dimensional array.

A shaped body or preform as described above contains about 10% to about 40% by volume of silicon carbide whiskers. These whiskers are dispersed uniformly throughout the preform with a high degree of randomness. The whisker orientation could he described as uniformly, but randomly, oriented, i.e., with approximately the same fiber density throughout the preform but with a very low or minimal percentage of fibers exhibiting planar or parallel orientation.

Figures 11, 11A:
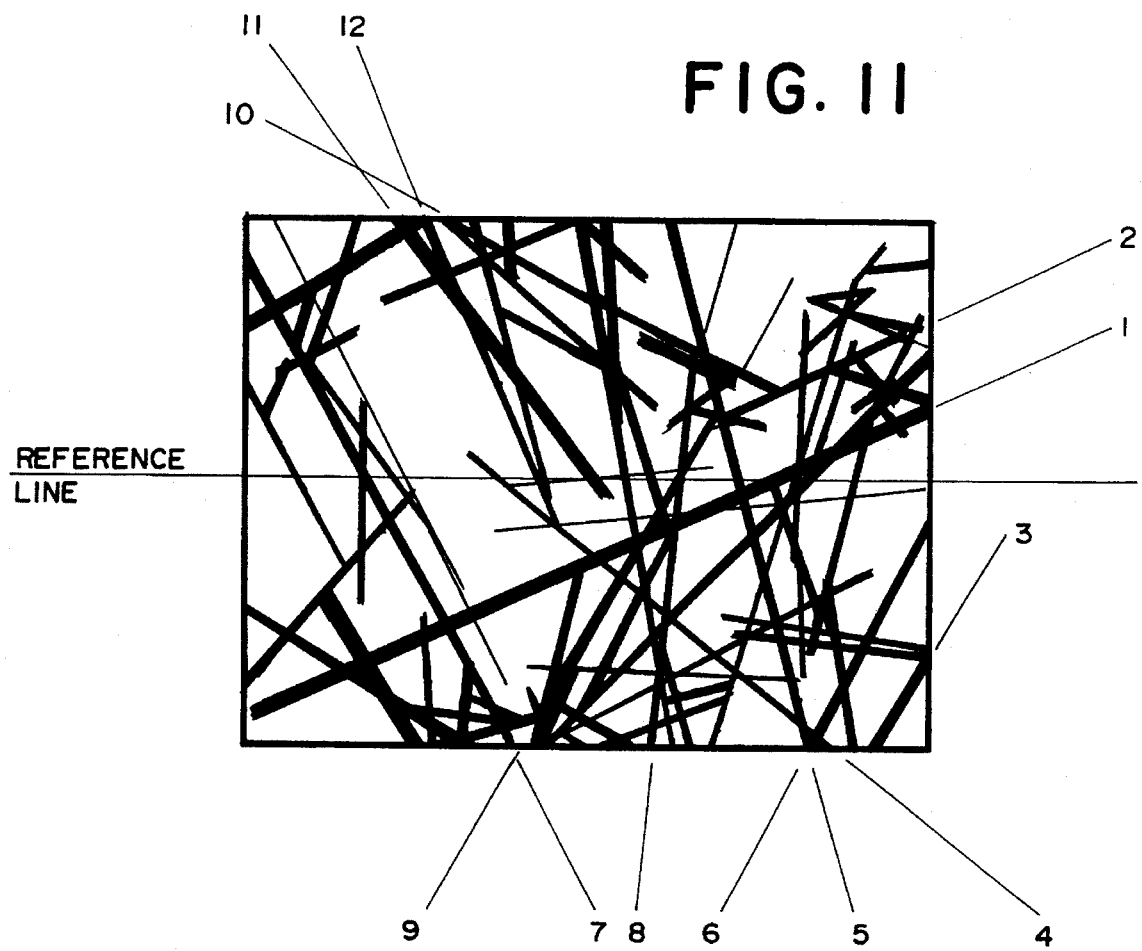
FIG. 11 is a photomicrograph with lines added to illustrate the calculation of average angular deviation.

In view of the importance of the three-dimensional random orientation of fibers or whiskers in applicants' shaped bodies, applicants calculated the average angular deviation of the fibers as follows:

Referring to the photomicrograph shown in FIG. 11, an arbitrary line was drawn on the photomicrograph and the line of a whisker was extended to intersect the arbitrary line. At the point of interaction, a circle was drawn to intersect both the whisker and the arbitrary line. And then the shortest distance from the point where the whisker intersects the circle to the arbitrary line was measured and divided by the radius of the circle. The result was the sine of the angle which the whisker makes with the arbitrary line. If the whisker is on one side of the line, the angle is considered positive and to the other negative.

After making a number of such calculations, the angles were added together without regard to sign, and divided by the total number of measurements to give an average deviation from the line. In the case of the three-dimensionally random oriented fibers shown in FIG. 11, the value was 53 degrees which compares well with a value of 45 degrees that would indicate a perfectly random or non-oriented array of fibers.

Figure 12:
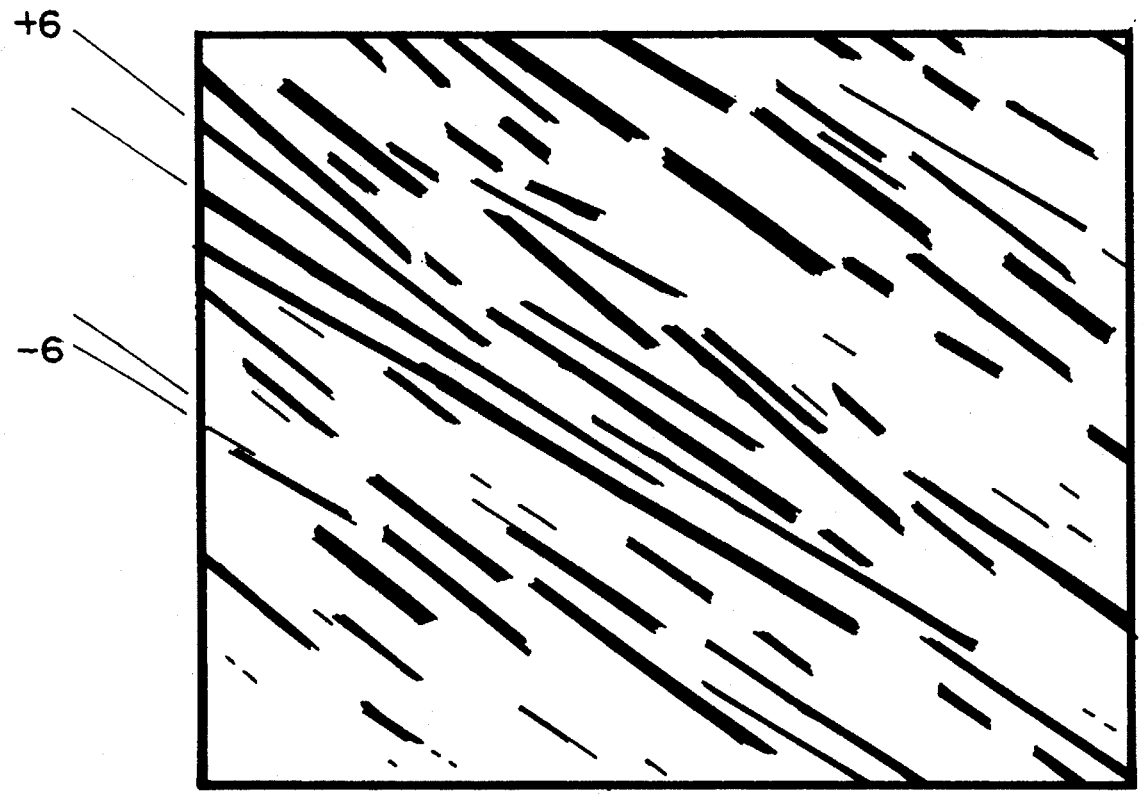
FIG. 12 is a photomicrograph showing a mass of fibers exhibiting generally planar or parallel orientation.

In considering the photomicrogaph (FIG. 12) of the approximately parallel oriented whiskers, the arbitrary line was drawn as close as the eye could estimate to the general orientation of the whiskers. In other words, the arbitrary line provides an approximation of the whisker orientation. In this case, adding together the positive angles and subtracting the negatives gave a total of approximately zero which indicate that the eye had selected a good mean value. And then, adding the angles, without regard to their signs, and dividing by the total number of measurements, gave an average deviation from the line of three degrees which indicates a relatively high degree of fiber orientation.

It is presently thought that an average angular deviation of between about 30 degrees and 60 degrees are preferred for a shaped body having optimal characteristics. However, it is also thought that an average angular deviation of less than about 15 degrees or more than 75 degrees may not be suitable for most applications.

Metal matrix composites as described herein take advantage of high fiber or whisker packing density and an increase in the three-dimensional random orientation of the fibers or whiskers. The composites also take advantage of the fact that the performance of these reinforcements is significantly greater than provided by particulate reinforcements. And, it has been found that even though the inorganic fibers or ceramic whiskers are inherently more expensive than particles, the improved physical characteristics of the composite offset the increase in cost.

It has also been found that for certain applications, it may be desirable to include an amount of ceramic powder together with the ceramic fibers for producing optimal properties. For example in one embodiment of the invention the preform contains about 20% by volume of silicon carbide whiskers. And then an additional 20% by volume of silicon carbide powder having a particle size in the range of 0.1 to 2.0 micron may be added to increase the total content of ceramic reinforcement in the composite. The powder can be added before or after the addition of a surfactant. It may also be possible to disperse the particulates or powdered material in the molten metal prior to infiltration of the preform. However, higher percentages (i.e., above 20–30% by volume of particulate) in the molten metal may cause problems with the infiltration of the preform. Nevertheless, preforms having a total volume fraction of solids of between 0.10 up to as much as about 0.80 are contemplated.

METHOD FOR PRODUCING SHAPED BODIES

A presently preferred method for forming shaped bodies in accordance with the present invention includes the step of providing and heating a mass of thermoplastic material such as a mixture of paraffin wax. Other thermoplastic materials such as polyolefins, acrylic resins, ethyl-vinyl acetate, and the like, may be used, as well as other waxes such as carnuba, polyethylene, synthetic hydrocarbon, etc.

The thermoplastic mass is heated to a liquid state, and a mass of snort inorganic fibers, such as silicon carbide whiskers, is added to the melt. These fibers can have average diameters ranging from about 0.1 microns to about 25 microns, preferably about 0.3 to about 10 microns, and average aspect (i.e., length to diameter) ratios of from about 20 to about 100. The fibers or whiskers are added in sufficient quantity to produce a mix having from about 5 to about 50% by volume fiber, but preferably from about 10 to about 40% by volume.

Organic surfactants in the amount from about 0.1 to 5% by weight are added to aid in the wetting and dispersion of the fibers or whiskers. There are many surfactants which can aid in the wetting of the fiber surfaces by the molten thermoplastic mass. However stearic acid, oleic acid, and sorbitan monostearate are presently preferred.

It is also sometimes desirable, particularly at fiber or whisker concentrations of less than 20% by volume, to add fugitive materials that improve the rheology of the mix with regard to molding. The fugitive materials are later removed from the shaped body by melting, thermal degradation, combustion, chemical leaching, vacuum distillation, or the like. Examples of such materials are very finely divided polymeric organic compounds, and short carbon or organic fibers.

The molten mix of thermoplastic material, fibers or whiskers, surfactants, and other additives is then subjected to high shear mixing for a period sufficient to develop a uniform, three-dimensionally random dispersion of the fibers. A number of high shear mixers such as sigma, cam, roller, double planetary, kneader-extruder, etc., can be employed. However, in the present embodiment of the invention, a double planetary mixer is employed. It is also advantageous to carry out at least the lash stage of mixing with the mixer bowl under vacuum. This removes any entrained air from the mix, improving the uniformity of the mix and the quality of the castings made therefrom.

The molten mix of thermoplastic material containing a uniform, three-dimensionally random dispersion of inorganic fiber or whiskers, is then introduced into a mold cavity defining a predetermined shape, without destroying the uniform, three-dimensionally random orientation of the fibers or whiskers. In a preferred embodiment of this invention, this is accomplished by low pressure injection molding, i.e., at between about 10 to about 150 psi.

The cooled molded or shaped mixture is removed from the mold, and at least about 95% by volume of the thermoplastic material is then removed from the shaped body. Removal can be accomplished by thermal distillation, thermal decomposition, vacuum distillation, chemical leaching, etc. It is also desirable to control the rate of removal and/or to support the shaped body during this step to prevent disruption, distortion, or slumping of the body. In a preferred embodiment of this invention, the part is tightly packed into a bed of finely divided absorbent inorganic powder. The temperature of this powder bed containing the shaped part is raised at a controlled rate and as the temperature reaches and exceeds the melting points of the organic materials contained in the shaped body, these constituents are wicked into and absorbed by the powder bed. In this preferred embodiment, the part is supported by the presence of the tightly packed powder bed, so that the part does not slump or distort during removal of the organic phase.

In a number of cases it is also desirable to prevent oxidation of the high surface area whiskers or fine particles. To prevent such oxidation which could adversely effect later infiltration by a molten metal, the shaped body is packed in carbon or engulfed in an inert atmosphere such as nitrogen, argon, helium, hydrogen, etc.

After at least about 95% by volume of the thermoplastic material has been removed from the molded body, the resulting shaped fiber or whisker body, or preform, will have sufficient strength to allow handling and infiltration by molten metal and the like. If desired, the body can be subjected to additional thermal treatment to decompose a carbon precursor included in the initial molding mix, or introduced subsequently by infiltration of the preform, to provide a carbon bond between the fibers or whiskers at their points of contact. Alternately, the preform can be subjected to a suitable temperature, in a proper atmosphere, to develope ceramic bonds at the points of contact of the fibers or whiskers. Other means of accomplishing bonding between the fibers, when this is desirable, would include the addition of carbon, silica, alumina, zirconia infiltration of the preform with a suspension of colloidal material, geletlon of a sol which had been introduced into the preform, chemical vapor infiltration, etc., followed by subsequent thermal treatment sintering, oxidation, etc., when desired.

It should be noted that difficulties in obtaining satisfactory rheological characteristics of the mix were encountered with fiber content of less than about 25% by volume fiber. Nevertheless, it was found that the low percentages of fiber that is in the order of 20% by volume or less could be subsequently molded satisfactorily if a fugitive material such as powdered polymeric organic material was added. The presently preferred fugitive material consists essentially of a powdered phenolic or polyethylene.

A majority if not all of the thermoplastic material including any fugitive material is generally removed by heating the molded organic ceramic article to a temperature of about 250° C. at normal atmospheric pressure. However, it may be desirable to remove the wax at a lower temperature which can be done by heating it in a vacuum. This approach can also be used to speed up the process by combining vacuum with increased temperature. The limitation is the combination at which evaporation of the organics causes disruption of the body.

Another method for forming a ceramic bond between fibers or fiber and ceramic particles is by reaction bonding. In reaction bonding the organic material includes a paraffin wax and a fugitive material such as a phenolic resin. The resin and or wax provides sufficient green strength for handling the preform even after a majority of the wax has been removed. The shaped fiber product is then placed in an oven or furnace and heated to remove a majority of the organic phase but also to decompose a portion of the organic leaving a carbon residue at the points of fiber contact for example, the body may be heated to about 400° C. to carbonize a phenolic resin. This carbon residue is reacted with silicon livid or vapor to for a silicon carbide bond.

In general this reaction can be commenced at above the melting point of silicon preferably at 1600° to 1700° C. at atmospheric pressure or at 1400° to 1500° C. under vacuum. It is true that the reaction bonding will leave traces of silicon metal which may be undesirable. However the silicon metal can be removed by acid etching with a mixture of hydrofluoric acid (HF) and nitric acid ($HNO_3$) or by subsequent heating in the presence of excess carbon. Another approach is to heat the shaped body in air at about 800° C. to form $SiO_2$ bridges or bonds at the fiber junction, and, another option is to infiltrate the body aftar removal of the organics with colloidal silica, colloidal alumina or colloidal zirconia. After drying, the body is heated to generate a ceramic bond at the whisker intersection.

METHOD FOR FORMING A METAL MATRIX COMPOSITE

A metal matrix composite having a reinforcing phase of three-dimensionaily oriented short inorganic fibers or whiskers according to the present invention can be formed by immersing a shaped body or preform as described above in molten metal, allowing the molten metal to infiltrate the fiber preform, and cooling the metal to incorporate the preform. The body can be slowly immersed to remove air or immersed under vacuum to avoid problems such as entrapped air.

The processing of metal matrix composites is described in an article by Mortensen et al. in the February, 1988 issue of *Journal of Metals*. Pages 12–19 which are incorporated herein by reference describe specifically two techniques that have been developed for the net-shaped solidification processing of metal matrix composites: infiltration of a preform with molten metal and slurry casting. The details of these processes will of course be understood by those skilled in the art. As described in the aforementioned article there are several techniques which are disclosed for promoting the wettability of the reinforcement by metals such as aluminum.

In order to minimize reaction and fiber degradation, it has been found desirable to use short exposure times with the molten aluminum solidified by rapid cooling as is done in a typical squeeze casting process. Another method to prevent degradation is to deposit inert coatings on the fiber by chemical vapor deposition or chemical vapor reaction. For example, the reaction of the surfaces of silicon carbide whiskers to form silicon dioxide which promotes wetting of the whiskers by aluminum. It is also desirable to keep the temperature of the material as low as possible and the exposure of the fiber to molten metal as short as possible to limit any reaction between the fibers and the metals.

In addition it is desirable to form a metal matrix composite with a minimum of porosity which can be accomplished by higher pressures such as squeeze casting. However, care should be taken to avoid fiber breakage. This may be done by injecting the metal at a low pressure until the preform is filled and then increasing the pressure to about 10,000–15,000 psi to fully densify the body.

One method of refining the grain size which is specific to metal matrix composites is by casting the metal into a fiber preform which is held at a temperature below the melting point of the molten metal.

A metal matrix composite according to the present invention can be produced by pressure or squeeze casting. In essence, pressure casting can be considered to include all methods of infiltrating a preform that includes the application of pressure to the infiltrated liquid. For example, the silicon carbide whisker preform of Example 2, which contained 0.200 volume fraction silicon carbide whiskers, was heated, placed into a suitable mold, and molten aluminum was squeezed cast into the preform. Photomicrographs of the resulting whisker reinforced metal matrix, illustrating the uniform three-dimensional orientation of the reinforcing whisker phase, is presented as FIGS. 6 and 7.

While the preferred embodiment of the invention have been described herein it is to be understood that alternatives and modifications may be made without departing from the scope of the appended claims.

What is claimed is:

1. A fiber-organic composition which is suitable for injection molding comprising a first component of from about 5% to about 50% by volume of three dimensionally randomly dispersed relatively short inorganic fibers having lengths of up to 100 micrometers and an aspect ratio of at least 10:1, and a second component comprising about 50% to about 95% by volume of a thermoplastic molding compound and a third component comprising an organic surfactant in an amount of about 0.01 to about 5% by weight of the total composition.

2. A fiber-organic composition according to claim 1 in which said first component includes from about 10% to about 40% by volume of inorganic fibers, said second component comprising about 60% to 90% by volume of a thermoplastic molding compound, and in which said third component comprises an organic surfactant in an amount of about 0.01 to about 3% by weight of the total composition.

3. A fiber-organic composition according to claim 2 in which said inorganic fibers are selected from a group alumina, aluminum nitride, aluminum silicate, boron carbide, carbon or graphite, magnesium oxide, mullite, silicon carbide, silicon dioxide, silicon nitride, titanium nitride, zirconium dioxide, iron, titanium and tungsten.

4. A fiber-organic composition according to claim 1 in which said thermoplastic molding compound is a paraffin wax.

5. A fiber organic composition according to claim 1 in which said thermoplastic molding compound includes two waxes.

* * * * *